United States Patent [19]

Penning

[11] Patent Number: 5,745,562
[45] Date of Patent: Apr. 28, 1998

[54] TELEPHONE STATION VOICE ANNOUNCE DEVICE AND METHOD

[75] Inventor: Randall J. Penning, Middletown, N.J.

[73] Assignee: Lucent Technologies, Inc., Murray Hill, N.J.

[21] Appl. No.: 579,174

[22] Filed: Dec. 27, 1995

[51] Int. Cl.$^6$ .............................. H04M 3/42; H04M 1/57
[52] U.S. Cl. ..................... 379/215; 379/88; 379/142; 379/376; 379/419
[58] Field of Search .................... 379/67, 88, 89, 379/70, 76, 82, 127, 142, 179, 182, 183, 215, 216, 217, 242, 243, 245, 246, 247, 251, 252, 253, 254, 372, 373, 374, 375, 376, 350, 354, 355, 387, 388, 418, 419

[56] References Cited

U.S. PATENT DOCUMENTS

| | | | |
|---|---|---|---|
| 4,899,358 | 2/1990 | Blakley | 379/67 |
| 4,922,523 | 5/1990 | Hashimoto | 379/215 X |
| 5,263,084 | 11/1993 | Chaput et al. | 379/215 |
| 5,265,145 | 11/1993 | Lim | 379/88 |
| 5,467,385 | 11/1995 | Reuben et al. | 379/88 |
| 5,526,403 | 6/1996 | Tam | 379/59 |
| 5,526,406 | 6/1996 | Luneau | 379/61 |
| 5,602,908 | 2/1997 | Fan | 379/199 |
| 5,604,790 | 2/1997 | Grimes | 379/67 |
| 5,636,269 | 6/1997 | Eisdorfer | 379/215 |

FOREIGN PATENT DOCUMENTS

| | | | |
|---|---|---|---|
| 61-287361 | 12/1986 | Japan | 379/374 |
| 6-078044 | 3/1994 | Japan | 379/374 |

OTHER PUBLICATIONS

"Your Wildfire Electronic Assistant," Wildfire Communiations, Inc., Lexington, Massachusetts, 1995.

Primary Examiner—Krista Zele
Assistant Examiner—Scott L. Weaver

[57] ABSTRACT

The invention provides a telephone station having a voice announce device. The telephone station includes user interface devices and a telephone station controller coupled to the user interface devices. The telephone station controller selects one of the user interface devices to announce a call from a remote caller based on a state of the telephone station. If the telephone station is in a NOT-BUSY state, the telephone station controller outputs a voice print corresponding to the remote caller to a speaker of the user interface devices to announce the call. If the telephone station is in a BUSY state, the telephone station controller outputs a voice print corresponding to the remote caller to a personal interface device of the user interface devices to announce the call. If the telephone station is in a SPEAKER state, the telephone station controller outputs displayable data to a display device of the user interface devices to announce the call.

16 Claims, 4 Drawing Sheets

5,745,562

TELEPHONE STATION VOICE ANNOUNCE DEVICE AND METHOD

BACKGROUND OF THE INVENTION

1. Field of the Invention

This invention relates to a device and method for a telephone station to voice announce a call of a remote caller.

2. Description of Related Art

Modern telephone stations include many useful features to assist a user to remember and organize telephone information. For example, a directory memory feature stores a large number of directory entries including information such as names, corresponding telephone numbers, account numbers, and so on. However, telephone stations fail to fully utilize these advanced features.

Current telephone stations fail to provide to users convenient features that may be available based on the information stored in the directory memory. For example, current telephone stations continue to alert the user of incoming calls through the ringer instead of announcing the name of the caller to the user even though the name of the caller can be recalled from the directory memory based on a caller ID.

SUMMARY OF THE INVENTION

The invention provides a telephone station having a voice announced device. The telephone station includes user interface devices and a telephone station controller coupled to the user interface devices. The telephone station controller selects one of the user interface devices to announce a call from a remote caller based on a state of the telephone station. If the state of the telephone is NOT-BUSY, the telephone station controller recalls a voice print from the directory memory based on a caller ID and selects a speaker of the user interface devices to announce the call by outputting the voice print to the speaker. If the state of the telephone station is BUSY and a personal interface device is in use, the telephone station controller recalls the voice print from the directory memory based on the caller ID and selects the personal interface device to announce the call by outputting the voice print to the personal interface device. If the state of the telephone station is SPEAKER, the telephone station controller selects the display device to announce the call by outputting displayable data to the display device. The data is at least one of the caller ID and the displayable data recalled from the directory memory based on the caller ID.

The invention also provides a voice announce method for a telephone station to announce a call from a remote caller. The voice announce method includes selecting one of the user interface devices of the telephone station and announcing the call from the remote caller through the selected one of the user interface devices.

BRIEF DESCRIPTION OF THE DRAWINGS

The invention will be described in detail with reference to the following drawings, wherein like numerals represent like elements and.

DETAILED DESCRIPTION OF PREFERRED EMBODIMENTS

Figure 1:
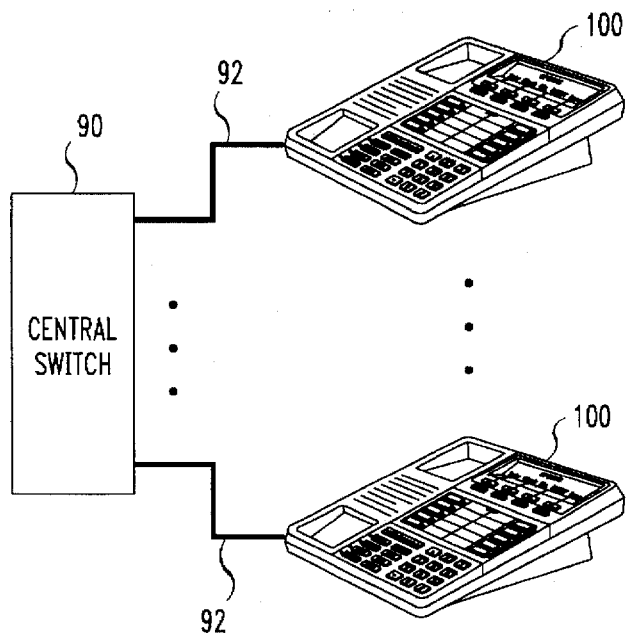
FIG. 1 is a block diagram of a plurality of telephone stations connected to a central switch.

FIG. 1 shows a block diagram including a plurality of telephone stations 100 connected to a central switch 90, such as a private branch exchange (PBX). The telephone stations 100 are connected to a central switch 90 through signal lines 92. Each of the signal lines 92 includes at least one bearer channel. The signal lines 92 may also include at least one signaling channel. The bearer channel carries digital or analog audio and/or application level data while the signaling channel carries inter-processor data. If the telephone station 100 is analog, separate bearer and signaling channels are not required.

Figure 2:
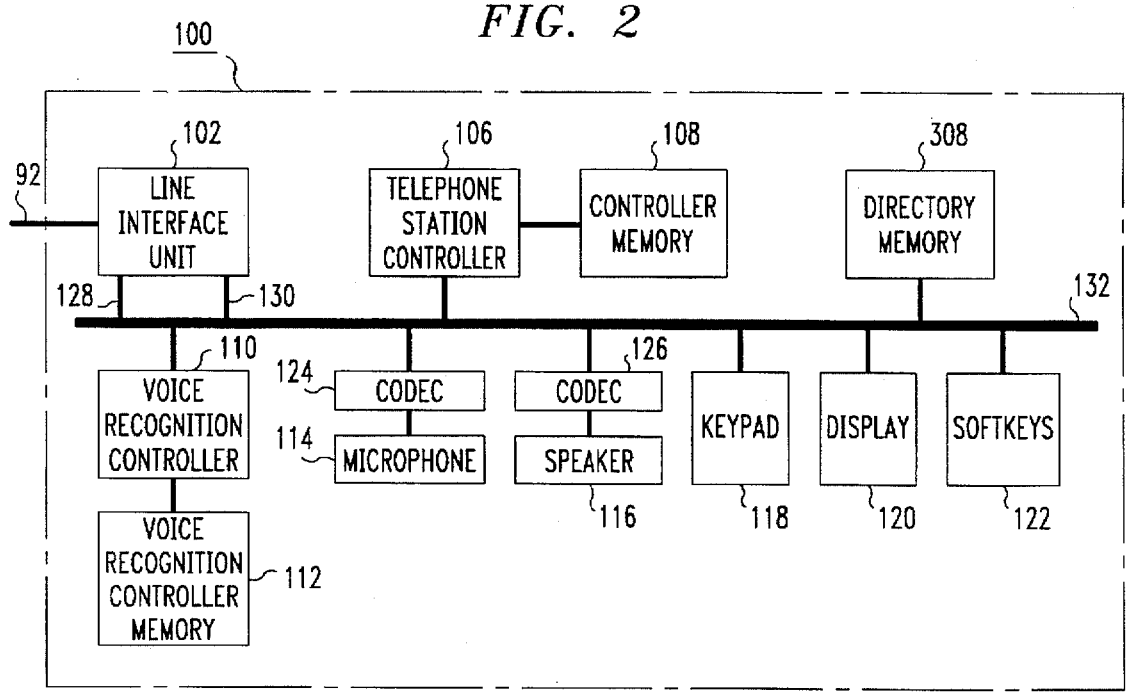
FIG. 2 is a block diagram of a telephone station with a voice announce device.

FIG. 2 shows a block diagram of the telephone station 100. The signal line 92 is input to the line interface unit 102. The line interface unit 102 converts the signal line 92 into one or more bearer channels 128 and a signaling channel 130. The signaling channel 130 contains information indicating that a remote caller has dialed the telephone station 100. The telephone station controller 106 scans the data on the signaling channel 130 through signal line 132. The signal line 132 interconnects the components of the telephone station 100 together.

The voice recognition controller 110 connected to the signal line 132 also scans the signaling channel 130. When the voice recognition controller 110 detects special codes on the signaling channel 130, it accesses the bearer channel 128 and communicates with the remote caller by outputting audio voice data and receiving audio voice commands from the remote caller.

Since the voice recognition controller 110 and the telephone station controller 106 can both interface directly with the bearer channel 128, two bearer channels 128 may be provided so that the voice recognition controller 110 and the telephone station controller 106 can both communicate through the two bearer channels 128 at the same time.

The telephone station controller 106 and the voice recognition controller 110 operate concurrently. However, if only one bearer channel 128 is available, then the telephone station controller 106 and the voice recognition controller 110 cannot both communicate through the single bearer channel 128. Thus, having two bearer channels 128 allows both the telephone station controller 106 and the voice recognition controller 110 to simultaneously communicate through the two bearer channels 128.

The voice recognition controller 120 and the telephone station controller 106 interface with a user at the telephone station 100 through user interfaces such as a microphone 114, a speaker 116, a keypad 118, a display device 120, and soft keys 122. These user interfaces are coupled to the signal line 132. The microphone 114 and the speaker 116 are connected to the signal line 132 through two CODEC (Coder Decoder) units 124 and 126, respectively.

If the telephone station controller 106 requires information to be entered by the user, the telephone station controller 106 speaks through the speaker 116 to inform the user of the required information. The speaker 116 is a sound output device that projects sound into the space surrounding the telephone station 100. A personal interface device (not shown) such as a hand set or head set outputs sounds only to persons using the personal interface device. Thus, when the telephone station controller 106 outputs sounds through the speaker 116, anyone within hearing distance of the speaker 116 hears the information output by the telephone station controller 106.

The telephone station controller 106 may also request additional information from the user by displaying a request on the display device 120 in addition to speaking through the speaker 116. The user responds through the keypad 118 to enter the required data or simply talk to the telephone station controller 106 through the microphone 114.

The telephone station controller 106 also uses the display device 120 to indicate choices that the user may select. When options are displayed on the display device 120, the locations of the options are placed in a corresponding relationship with the soft keys 122. The user selects the displayed option by pushing a corresponding soft key 122.

Figure 3:
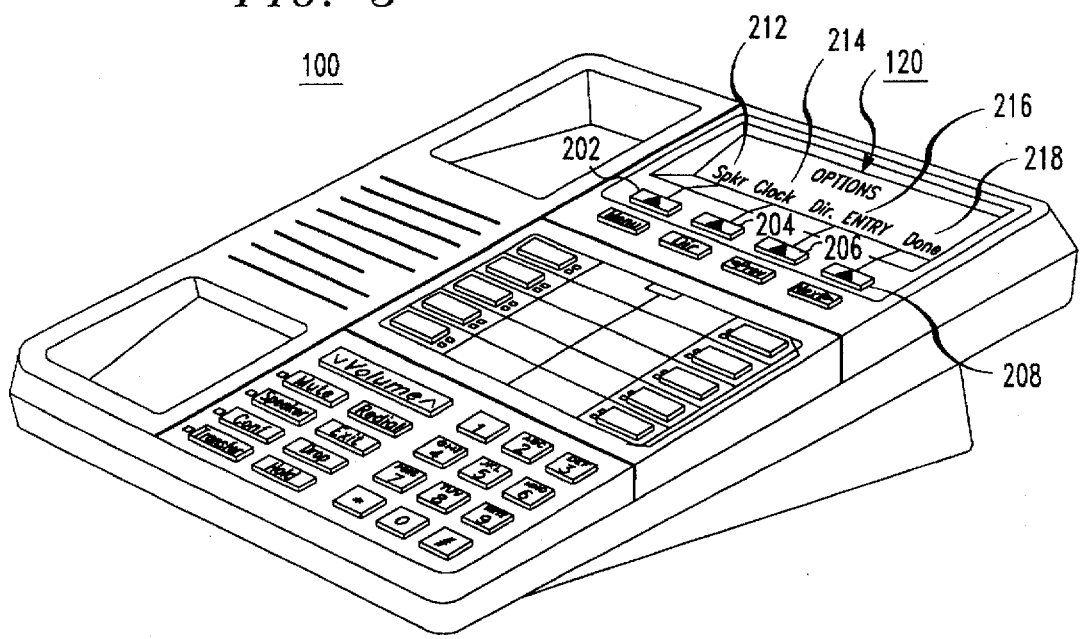
FIG. 3 is a diagram of soft keys.

FIG. 3 shows the display device 120 that has option display areas 212, 214, 216 and 218. Soft keys 202, 204, 206 and 208 are located close to the corresponding option selections displayed on the display device 120. The user selects the displayed option by simply pushing the corresponding soft key 202–208.

The telephone station controller 106 responds to specific voice commands. For example, when the telephone station 100 rings in response to a remote call, the user may speak to the telephone to "answer the phone." When the telephone station controller 106 receives the "answer the phone" command, the telephone station controller 106 takes the telephone station 100 off-hook and sets the telephone station 100 in a SPEAKER state. The remote caller's audio signals are output through the speaker 116 and the user's audio signals are output to the remote caller through the microphone 114.

When the user completes a call, the user may issue a "hang up the phone" command. When the telephone station controller 106 receives the "hang up the phone" command, the telephone station controller 106 returns the telephone station 100 to on-hook.

FIG. 2 shows a directory memory 308 which contains names and numbers entered by the user. The names may be voice prints entered by the user through the microphone 114.

The telephone station 100 may be placed in a voice announce mode by either a voice command "announce call" or by pushing either a pre-assigned key of the keypad 118 or one of the soft keys 122.

When the telephone station 100 is in a voice announce mode, the telephone station controller 106 initiates the telephone station ringer when a call is received from a remote caller. The telephone station controller 106 obtains the telephone number of the remote caller through a caller ID and searches the directory memory 308 for a directory entry based on the telephone number of the remote caller. If the telephone number of the remote caller is found in the directory memory 308, the telephone station controller 106 recalls a voice print or text identifying the remote caller that can be converted to a voice print from the directory memory 308 that corresponds to the remote caller. Then the telephone station controller 106 determines the state of the telephone station 100. If the telephone station 100 is not busy, then the telephone station 100 is in a NOT-BUSY state and the telephone station controller 106 momentarily stops the telephone station 100 from ringing after the first ring and outputs either the voice print directly or the voice print corresponding to the text through the speaker 116.

If the telephone station 100 is busy, the telephone station 100 is in a BUSY state and the telephone station controller 106 outputs the voice print through a handset or a headset of the telephone station 100 if either of these user interface devices are being used. The telephone station controller 106 announces the name of the remote caller by inserting the voice print corresponding to the telephone number of the remote caller into the handset or headset.

If neither the handset nor the headset is in use and the state of the telephone station is BUSY, the telephone station controller 106 displays the data such as the number of the remote caller on the display device 120. The telephone station controller 106 also may display other data from the directory memory 308 if the number of the remote caller is found in the directory memory 308.

After the name of the remote caller is announced or the data of the remote caller is displayed on the display device 120, the telephone station controller 106 continues to ring the telephone station 100 until the user decides to answer the call.

The telephone station 100 is in the SPEAKER state when the user is communicating to a first remote caller using the microphone 114 and the speaker 116. In this state, the telephone station controller 304 outputs only displayable data to the display device 120 because announcing a second remote caller through the speaker 116 could possibly breach a security of the user. If the second remote caller is announced through the speaker 116, the first remote caller or any other person that may have access to the first caller-user conversation could hear the second remote caller being announced. However, in this state, it may be possible for the user to speak through the head set or hand set while the conversation is output through the speaker 116.

When the telephone station state is NOT-BUSY, the security concerns are different than when the telephone station state is SPEAKER. When the telephone station 100 is in the NOT-BUSY state, the incoming call is announced only to the immediate area of the telephone station 100. In contrast, when in the SPEAKER state, announcing the second remote caller through the speaker 116 may expose to many unknown parties the fact that the second remote caller had called the user.

The telephone station controller 304 has the capability to select an appropriate user interface device to announce the second remote caller based on a predetermined scheme and the state of the telephone station 100. While the preferred embodiments announce the second remote caller through the hand set, head set or the display device 120 when the telephone station 100 is in the busy state, other choices are also possible depending on the specific circumstances and user interface devices that are available.

The telephone station controller 106 responds to any number of other voice commands such as voice dial command, conference voice command, transfer voice command, and so on. For the voice commands mentioned above, the user enters a name of a person to be called by speaking into the microphone 114. The telephone station controller 106 receives a voice print from the microphone 114 and searches the directory memory 308 to find a directory entry that contains the received voice print. Each of the directory entries in the directory memory 308 contains a voice print corresponding to the name of the directory entry. The telephone station controller 106 compares the received voice print with the voice print in each of the directory entries until a match is found. When a match is found, the telephone station controller 106 recalls the number associated with the directory entry as the telephone number of the spoken name.

Figure 4:
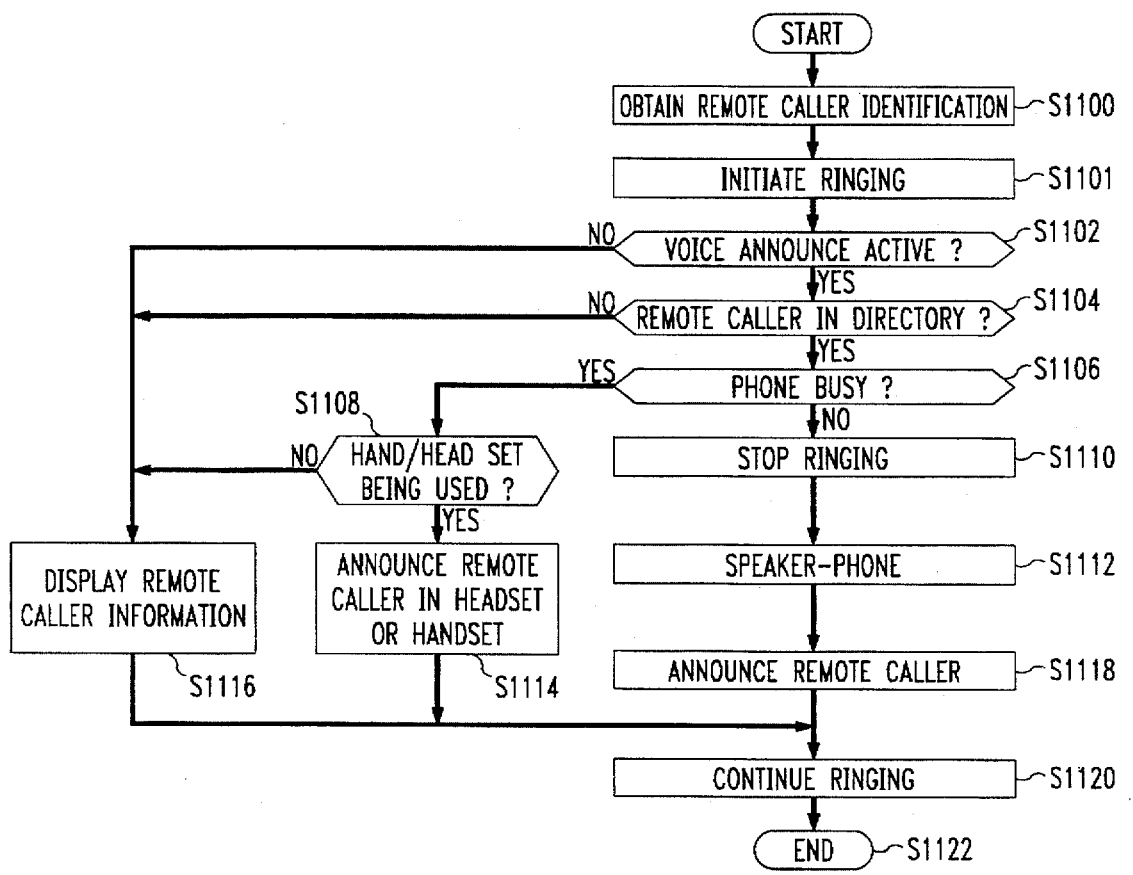
FIG. 4 is a flowchart of a telephone station voice announce process.

FIG. 4 is a flowchart of the voice announce process. In step S1100, the telephone station controller 106 obtains the telephone number of the remote caller from the caller ID and then goes to step S1101. In step S1101, the telephone station controller 106 initiates the ringing of the telephone station 100 and then goes to step S1102.

In step S1102, the telephone station controller 106 determines whether the voice announce feature is activated by the user. If the voice announce feature is activated, the telephone station controller 106 goes to step S1104. Otherwise, the telephone station controller 106 goes to step S1116.

In step S1104, the telephone station controller 106 searches the directory memory 308. If the telephone number of the caller ID is found in a directory entry of the directory memory 308, the telephone station controller goes to step S1106. Otherwise, the telephone station controller 106 goes to step S1116. In step S1116, the telephone station controller 106 displays displayable caller ID information on the display device 120 and then goes to step S1120.

In step S1106, the telephone station controller 106 determines whether the telephone station 100 is in a BUSY state. If the telephone station 100 is in the BUSY state, then the telephone station controller 106 goes to S1108. Otherwise, the telephone station controller 106 goes to S1110.

In step S1108, the telephone station controller determines whether a handset or a headset is in use. If a handset or a headset is in use, the telephone station controller 106 goes to step S1114. Otherwise, the telephone station controller 106 goes to step S1116. In step S1114, the telephone station controller 106 outputs a voice print to the handset or headset to announce the remote caller to the user. The voice print is recalled from the directory memory 308 and corresponds to the number of the remote caller. Then, the telephone station controller 106 goes to S1120.

In step S1110, the telephone station controller 106 stops the telephone station 100 from ringing and goes to step S1112. In step S1112, the telephone station controller 106 places the telephone station 100 in a SPEAKER state and then goes to step S1118. In step S1118, the telephone station controller 106 outputs the voice print corresponding to the telephone number of the remote caller to the speaker 116 and then goes to step S1120.

In step S1120, the telephone station controller 106 resumes the ringing of the telephone station 100 and then goes to S1122. In step S1122, the telephone station controller 106 ends the voice announce process.

Figure 5:
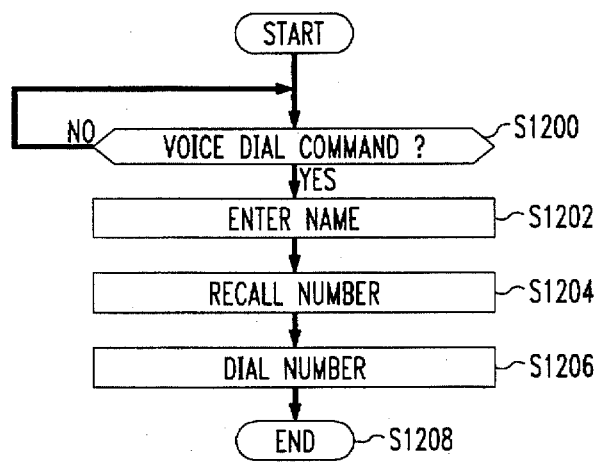
FIG. 5 is a flowchart of a voice dial process.

FIG. 5 shows a flowchart of the voice dial process. In step S1200, the telephone station controller 106 determines whether a voice dial command is received. If the user speaks the voice dial command into the microphone 114, the voice recognition controller 110 recognizes the voice dial command and sends the command to the telephone station controller 106. The telephone station controller 106 responds to the voice dial command by going to step S1202. In step S1202, the telephone station controller 106 requests the user to speak a name of the person to be called and then goes to step S1204. The microphone 114 generates a voice print corresponding to the name spoken by the user.

In step S1204, the telephone station controller 106 searches the directory memory 308 for a directory entry that contains the voice print spoken by user. When the directory entry is found, the telephone station controller 106 recalls the number from the directory entry and then goes to step S1206. In step S1206, the telephone station controller 106 dials the number that was found in the directory memory 308 and establishes the call and then goes to step S1208 and ends the voice dial command process.

Figure 6:
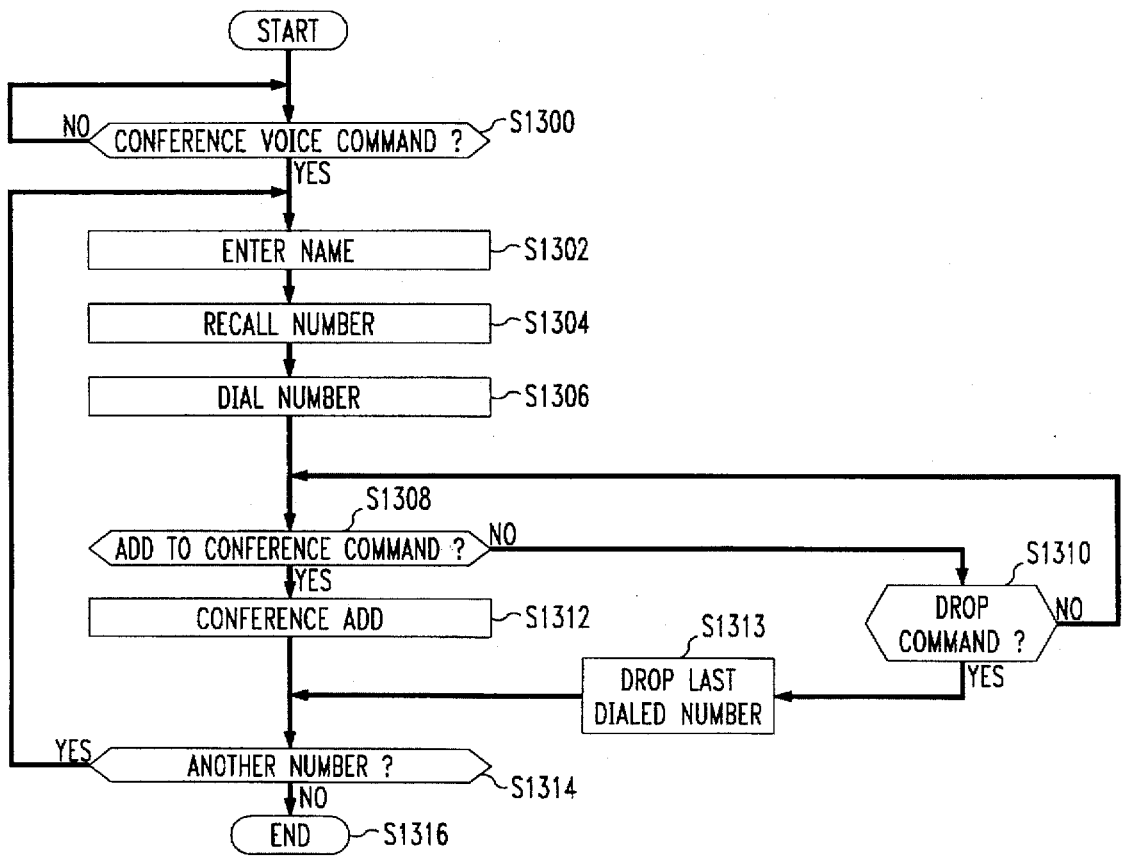
FIG. 6 is a flowchart of a conference voice command process.

FIG. 6 is a flowchart of the conference voice command. In step S1300, the telephone station controller 106 determines whether a conference voice command is received. When the user speaks the conference voice command into the microphone 114, the telephone station controller 106 receives the command from the voice recognition controller 110 and goes to step S1302. In step S1302, the telephone station controller 106 requests the user to speak the name of a potential conferee into the microphone 114 and goes to step S1304.

In step S1304, the telephone station controller 106 searches the directory memory 308 for a directory entry that contains a voice print that matches the voice print received from the user in step S1302. When a match is found, the corresponding number in the directory entry is recalled and the telephone station controller 106 goes to step S1306. In step S1306, the telephone station controller 106 dials the number of the potential conferee, and goes to step S1308.

In step S1308, the telephone station controller 106 waits for a command from the user to add the call to the conference or to disconnect from the potential conferee. If the user desires to add the conferee to the conference call, the telephone station controller 106 goes to step S1312. Otherwise, the telephone station controller 106 goes to step S1310. In step S1310, the telephone station controller 106 queries whether the user issued a drop command. If the user issued the drop command, the telephone station controller 106 goes to step S1313. Otherwise, the telephone station controller 106 returns to step S1308. In step S1313, the telephone station controller 106 goes on-hook with respect to the last dialed number dialed in step S1306 and goes to step S1314. In step S1312, the telephone station controller 106 adds the potential conferee to the conference call and goes to step S1314.

In step S1314, the telephone station controller 106 queries whether the user desires to add another conferee to the conference call. If the user desires to add another conferee to the conference call, the telephone station controller returns to step S1302 and again requests the name of a potential conferee. Otherwise, the telephone station controller goes to step S1316 and ends the add conferee process and continues normal conference call processing.

Figure 7:
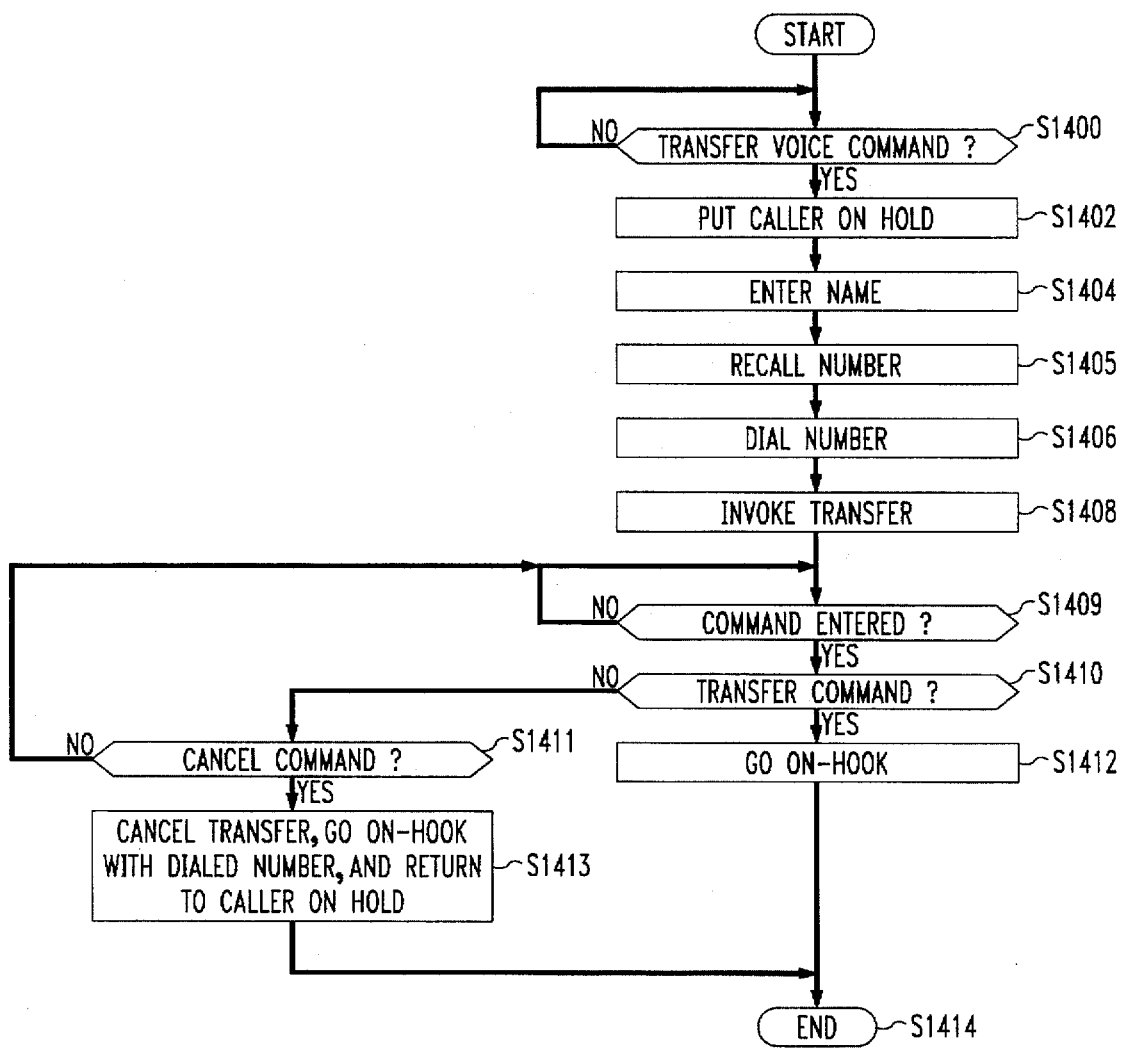
FIG. 7 is a flowchart of a transfer voice command process.

FIG. 7 shows a flowchart of a transfer voice command process. In step S1400, the telephone station controller 106 determines whether a transfer voice command is received. If a transfer voice command is received, the telephone station controller 106 goes to step S1402. Otherwise, the telephone station controller 106 returns to step S1400.

In step S1402, the telephone station controller 106 places the remote caller currently connected to the telephone station 100 on hold and goes to step S1404. In step S1404, the telephone station controller 106 requests the user to enter the name of a person to which a call is to be transferred and goes to step S1405. In step S1405, the telephone station controller 106 receives a voice print from the user and searches the directory memory 308 for a directory entry containing a voice print that matches the voice print received from the user. When a match is found, the telephone station controller 106 recalls a number corresponding to the voice print and goes to step S1406.

In step S1406, the telephone station controller 106 dials the number retrieved from the directory memory 308 and establishes a connection to the person to which the call is to be transferred and goes to step S1409. In step S1409, the telephone station controller 106 waits for the user to enter the transfer command. If the user enters the transfer command, the telephone station controller 106 goes to step S1410. Otherwise, the telephone station controller returns to step S1409 and continue to wait for the user command.

In step S1410, the telephone station controller 106 determines whether the user entered a transfer command to transfer the call. If the transfer call command was entered, the telephone station controller 106 goes to step S1412. Otherwise, the telephone station controller 106 goes to step S1411. In step S1411, the telephone station controller 106 determines whether the user entered a cancel command. If the user entered a cancel command, the telephone station controller 106 goes to step S1413. Otherwise, the telephone station controller 106 returns to S1409 and continues to wait for the user to enter either a command to transfer or to cancel the call transfer process.

In step S1413, the telephone station controller cancels the transfer feature of the central switch 90, goes on-hook with respect to the number dialed in step S1406 and returns the user to the original caller placed on hold in step S1402. Then, the telephone station controller 106 goes to step S1414.

In step S1412, the telephone station controller 106 places the telephone station 100 on-hook so that the remote caller is connected to the person to which the call is to be transferred and the telephone station controller 106 goes to step S1414. In step S1414, the telephone station controller 106 ends the transfer voice command process.

The telephone station controller 106, the controller memory 108 and the directory memory 308 may be embodied in hardware using dedicated components. Application specific integrated circuits (ASIC) may also be used for each of the components listed above. Portions of each component may be combined into different ASICs for optimum performance characteristics.

If the voice recognition controller 110 is a high powered processor such as a digital signal processor (DSP), the complete telephone station controller 106 may be implemented together with the voice recognition controller 110 as programs executed by the digital signal processor.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A telephone station voice announce device for a telephone station, comprising:

user interface devices; and a telephone station controller coupled to the user interface devices, wherein the telephone station controller selects at least one of the user interface devices to announce a call from a remote caller based on a state of the telephone station and wherein the user interface devices comprise a display device, and if the state of the telephone station is SPEAKER and BUSY, then the telephone station controller selects only the display device to announce the call by outputting displayable data to the display device.

2. The device of claim 1, further comprising a directory memory, wherein the telephone station controller receives a caller ID that contains a number of a telephone station used by the remote caller and recalls data corresponding to the remote caller from the directory memory based on the caller ID.

3. The device of claim 2, wherein the user interface devices include a speaker and if the state of the telephone station is NOT-BUSY, the telephone station controller announces the call by outputting to the speaker a voice print corresponding to the data recalled from the directory memory.

4. The device of claim 3, wherein the data recalled from the directory memory is at least one of a voice print and text, and if the recalled data is the text, the telephone station controller at least one of converts the text into a voice print corresponding to the text and displays the text on the display device of the user interface devices, the telephone station controller outputting to the speaker at least one of the voice print recalled from the directory memory and the voice print corresponding to the text.

5. The device of claim 2, wherein the user interface devices include a personal interface device, and if the state of the telephone station is BUSY and the personal interface device is in use, then the telephone station controller announces the call by outputting to the personal interface device a voice print corresponding to the data.

6. The device of claim 5, wherein the data recalled from the directory memory is at least one of a voice print and text, and if the recalled data is the text, the telephone station controller at least one of converts the text into a voice print corresponding to the text and displays the text on the display of the user interface devices, the telephone station controller outputting to the personal interface device at least one of the voice print recalled from the directory memory and the voice print corresponding to the text.

7. The device of claim 5, wherein the personal interface device comprises at least one of a hand set and a head set.

8. The device of claim 2, wherein the displayable data includes at least one of the caller ID and displayable data recalled from the directory memory based on the caller ID.

9. A telephone station voice announce method for a telephone station to voice announce a call from a remote caller, comprising:

selecting at least one of user interface devices of the telephone station; and announcing the call from the remote caller through the selected one of the user interface devices, wherein a telephone station controller of the telephone station is coupled to the user interface devices and selects the one of the user interface devices based on a state of the telephone station, and wherein if the state of the telephone station is SPEAKER and BUSY, only a display device of the user interface device is selected to announce the call.

10. The method of claim 9, further comprising:

receiving a caller ID that contains a number of a telephone station of the remote caller; and recalling data corresponding to the remote caller from a directory memory based on the caller ID, wherein the telephone station controller receives the caller ID and recalls the data from the directory memory.

11. The method of claim 10, wherein announcing the call comprises:

selecting a speaker of the user interface devices to announce the call if the state of the telephone station is NOT-BUSY, wherein the telephone station controller announces the call by outputting to the speaker a voice print corresponding to the data recalled from the directory memory.

12. The method of claim 11, wherein the data recalled from the directory memory is at least one of a voice print and text, and if the recalled data is text, the telephone station controller at least one of converts the text into a voice print corresponding to the text and displays the text on the display device of the user interface devices, the telephone station controller outputting to the speaker at least one of the voice print recalled from the directory memory and the voice print corresponding to the text.

13. The method of claim 10, wherein announcing the call comprises:

selecting a personal interface device of the user interface devices to announce the call if the state of the telephone station is BUSY and the personal interface device is in use, wherein the telephone station controller announces the call by outputting to the personal interface device a voice print corresponding to the data recalled from the directory memory.

14. The method of claim 13, wherein the data recalled from the directory memory is at least one of a voice print and text, and if the recalled data is text, the telephone station controller at least one of converts the text into a voice print corresponding to the text and displays the text on the display device of the user interface devices, the telephone station controller outputting to the personal interface device at least one of the voice print recalled from the directory memory and the voice print corresponding to the text.

15. The method of claim 13, wherein the personal interface device comprises at least a head set and a hand set.

16. The method of claim 10, wherein the data includes at least one of the caller ID and displayable data recalled from a directory memory based on the caller ID, wherein the telephone station controller recalls the displayable data from the directory memory and selects the display device by outputting the at least one of the caller ID and the displayable data to the display device.

\* \* \* \* \*